United States Patent [19]
Roberts

[11] 4,336,643
[45] Jun. 29, 1982

[54] METHOD FOR THE PROCESSING OF HEAT EXCHANGER, TUBE-STRIP ELEMENTS

[75] Inventor: Sidney Roberts, Stamford, Conn.

[73] Assignee: Thermatool Corp., Stamford, Conn.

[21] Appl. No.: 122,468

[22] Filed: Feb. 19, 1980

[51] Int. Cl.³ .............................................. B23P 15/26
[52] U.S. Cl. ................................. 29/157.3 C; 29/727; 228/183
[58] Field of Search .................. 29/157.3 R, 157.3 A, 29/157.3 B, 157.3 C, 157.3 D, 157.4, 727, 726; 228/183

[56] References Cited

U.S. PATENT DOCUMENTS

| | | | |
|---|---|---|---|
| 2,772,077 | 11/1956 | Polad | 29/157.3 C |
| 3,332,134 | 7/1967 | Denis | 29/157.3 |
| 3,440,704 | 4/1969 | Collins | 29/157.3 B |
| 3,954,218 | 5/1976 | van Dijk | 113/118 C |

*Primary Examiner*—Francis S. Husar
*Assistant Examiner*—V. K. Rising
*Attorney, Agent, or Firm*—Brooks, Haidt, Haffner & Delahunty

[57] ABSTRACT

Method and apparatus for processing solar panel elements which have been cut from relatively long lengths of metal tubing secured to metal strip and which are to be joined at their opposite ends to headers. At a first station, the elements are, if necessary, stretched in the longitudinal direction and straightened, and the tube end portions are shaped so as to be substantially circular in cross-section. At a second station, the exterior surfaces of the tube end portions are machined to the desired diameter, and portions of the strip immediately adjacent to the tube end portions are removed. At a third station, the remaining portions of the strip outwardly of the previously removed portions thereof are removed by shearing. The elements are moved stepwise from station to station, and three panel elements may be processed simultaneously.

5 Claims, 21 Drawing Figures

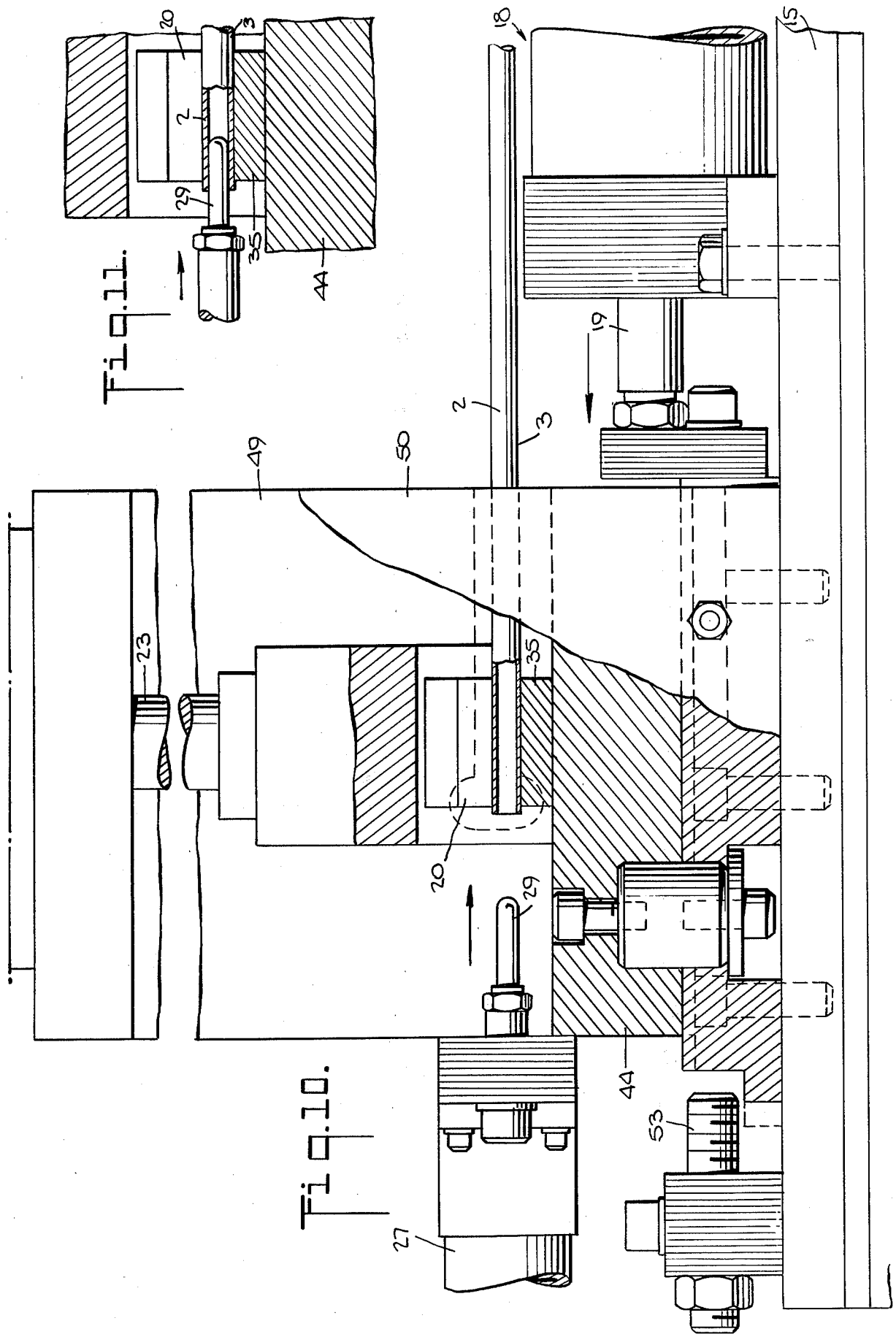

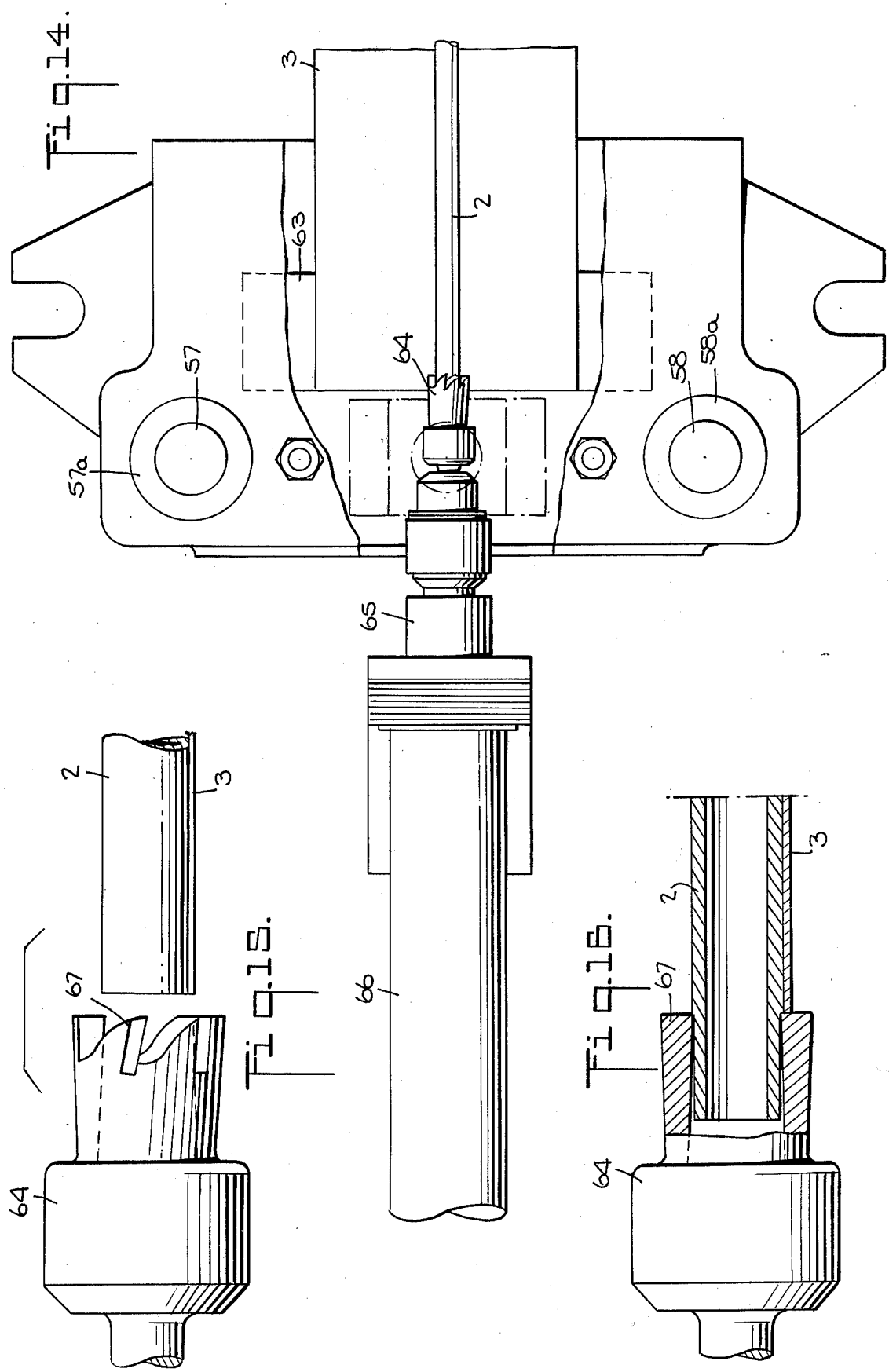

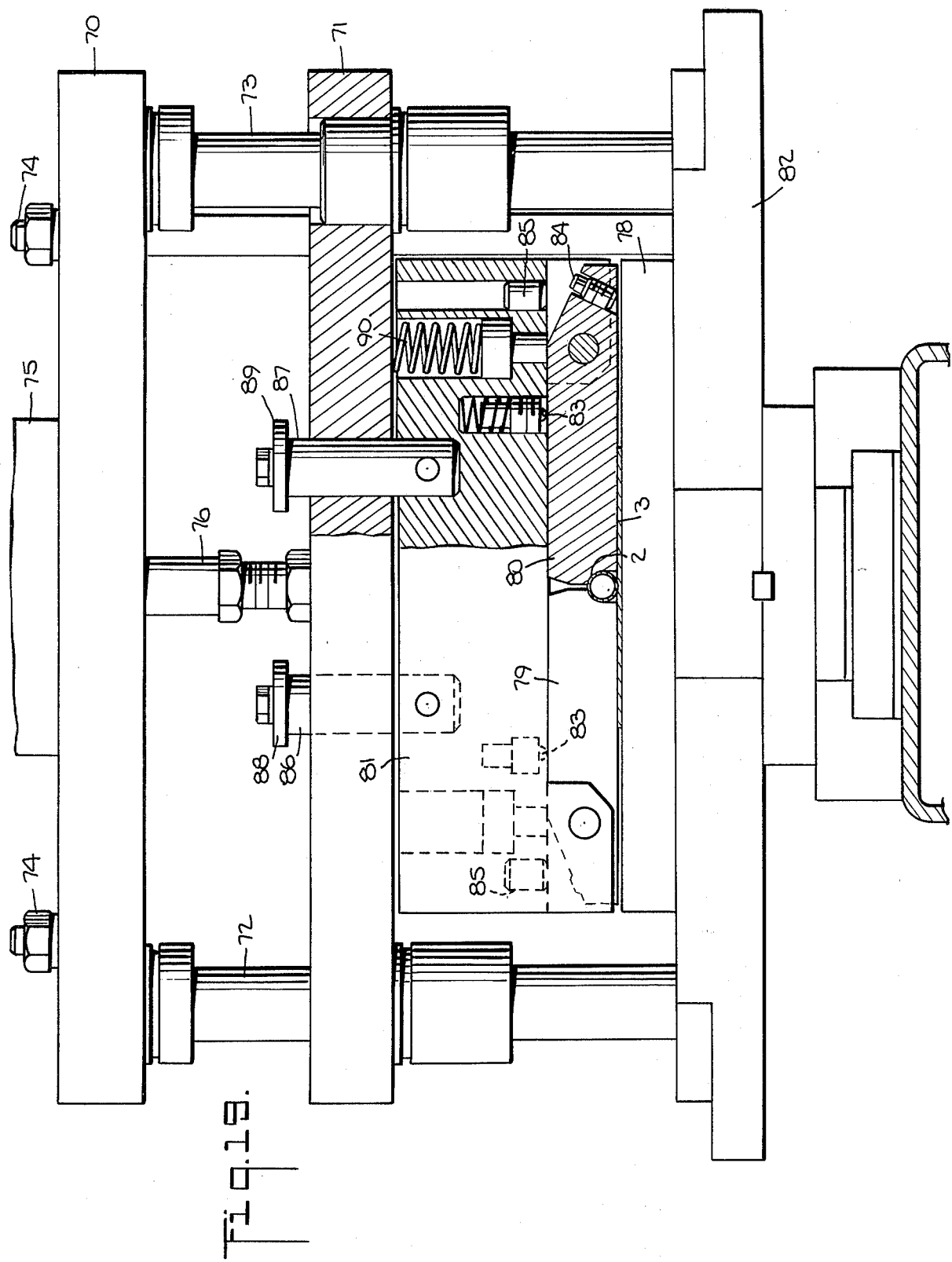

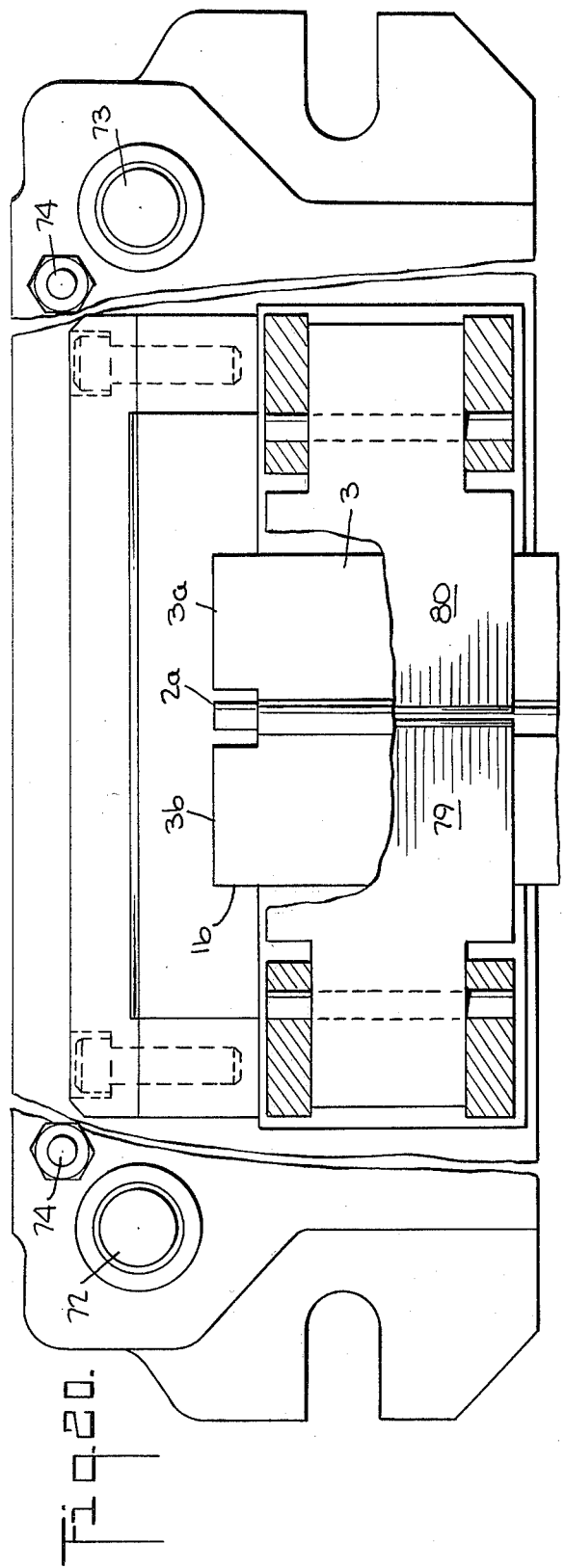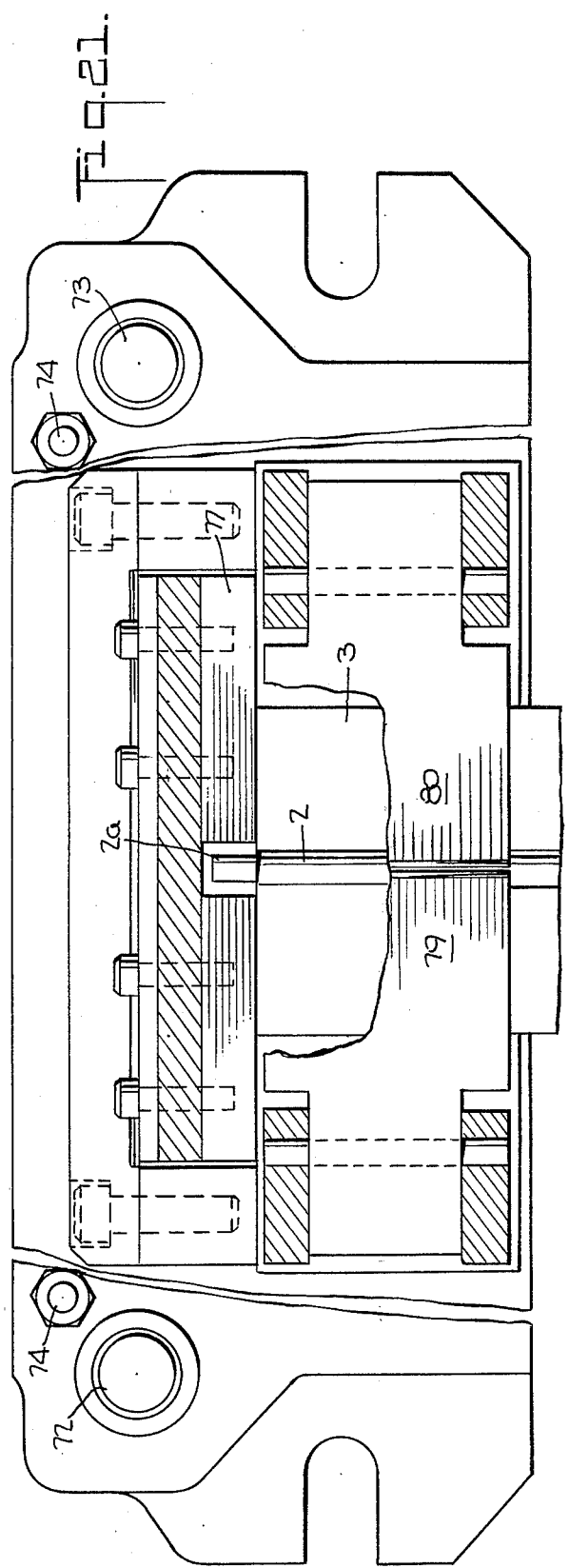

METHOD FOR THE PROCESSING OF HEAT EXCHANGER, TUBE-STRIP ELEMENTS

This invention relates to methods and apparatus for the manufacture of heat exchanger panels of the type sometimes known as solar panels and which comprise heat absorbing metal sheets having tubing for conveying fluid secured thereto by heated and cooled metal.

Panels of the type to which the invention relates and the manufacture thereof are illustrated and described in U.S. Pat. No. 4,136,272. In the methods described in U.S. Pat. No. 4,136,272 of high frequency welding techniques are used for joining the tubing and the metal sheet or strip, and several of the individual elements, each comprising a single tube joined to a strip, are placed side-by-side and joined to headers by solder.

The co-pending application of Robert R. Harriau and Humfrey N. Udall entitled "Methods and Apparatus for the Manufacture of Heat Exchanger Panels", filed Feb. 19, 1980 Ser. No. 122,467 and assigned to the assignee of this application, describes methods and apparatus for the manufacture of metal tubing welded to metal strip on long lengths which is thereafter cut to shorter lengths to form elements for a heat exchanger panel. Such elements cannot be used readily for the formation of panels because the tubing has been deformed during the welding process, the ends of the tubing must be shaped, sized and exposed to permit ready assembly with headers and in some cases, the tube-strip combination must be stretched to remove ripples in the strip and/or straightened.

One object of the invention is to provide methods and apparatus for rapidly and efficiently processing solar panel elements, each of which comprises a length of tubing continuously secured along its length to a corresponding length of metal strip by heated and cooled metal, so as to permit such elements to be assembled easily with headers. The tubing may be secured to the strip by welding or by soldering or brazing.

In the presently preferred embodiment of the invention, end portions of the tube of a panel element are enlarged in diameter and made substantially circular in cross-section at a first station of the apparatus of the invention. Also, each panel element may, if necessary, be stretched and straightened at such station. The element is then transferred to a second station in the apparatus where the tube ends are exteriorly machined and at the same time, portions of the strip adjacent to the tube ends are removed. Thereafter, the element is transferred to a third station in the apparatus where further portions of the strip adjacent the tube ends are removed, or bent away from the plane of the strip. The elements are transferred from station to station by a stepping or indexing conveyor so that three elements may be processed simultaneously, one at each station. If stretching and straightening are not required before the other operations, the first station may be used only for enlarging and shaping the tube end portions.

Other objects and advantages of the present invention will be apparent from the following detailed description of the presently preferred embodiments thereof, which description should be considered in conjunction with the accompanying drawings in which:

FIG. 10 is an enlarged, side elevation view, partly in cross-section, of a portion of the apparatus shown in FIG. 7.

FIG. 11 is a fragmentary, side elevation view of a portion of the apparatus shown in FIG. 10;

FIG. 14 is a plan view, partly broken away, of the apparatus shown in FIG. 12 and 13;

FIGS. 15 and 16 are enlarged, side elevation views of a portion of the apparatus shown in FIGS. 12–14;

FIG. 19 is an end elevation view, partly in cross-section of the apparatus shown in FIGS. 17 and 18; and FIGS. 20 and 21 are plan views, partly in cross-section, of the apparatus shown in FIG. 17–19, the punch omitted in FIG. 20 being shown in FIG. 21.

Figure 1:
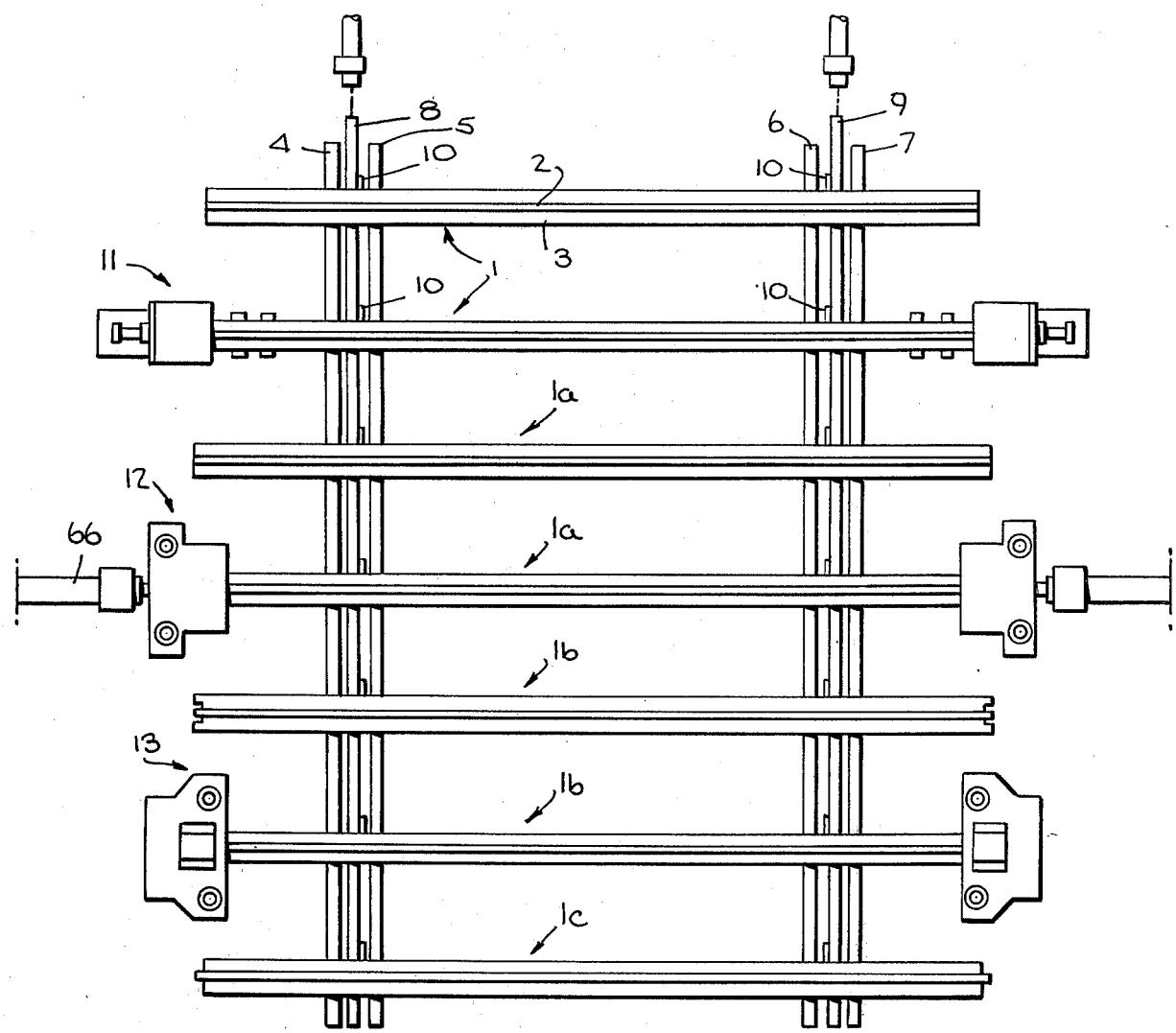
FIG. 1 is a diagrammatic, plan view of the panel element processing apparatus of the invention.
Figure 2:
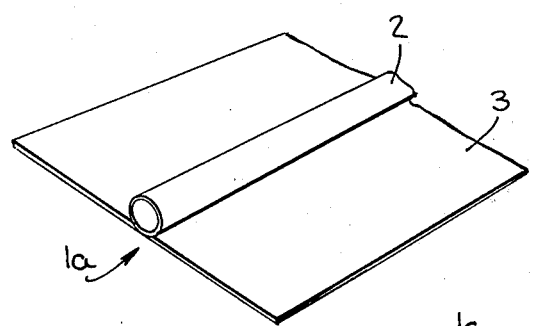
FIGS. 2–4 are fragmentary, perspective views of one end of a panel element in the various shapes of the processing thereof.

FIG. 1 illustrates schematically the presently preferred embodiment of the apparatus of the invention for performing the method of the invention. Panel elements 1 comprising a metal tube 2 secured to a metal strip 3, preferably by heated and cooled metal, such as weld metal, solder or brazing metal, are placed on the rails 4–7 of a stepping conveyor of a well-known type and having a pair of intermittently reciprocating driven rods 8 and 9 with one-way pushing fingers 10. The element 1 may be of the type described in the co-pending application of Wallace C. Rudd entitled "Heat Exchanger Panels and Method of Manufacture, filed Jan. 21, 1980 and Ser. No. 113,790 Humfrey N. Udall, entitled "Heat Exchanger Panels and Method of Manufacture filed Jan. 21, 1980, and Ser. No. 113,796 and Robert R. Harrian and Humfrey N. Udall, entitled "methods for the manufacture of heat-exchanger panels" filed Feb. 19, 1980 and Ser. No. 122,467, all of such applications being assigned to the assignee of this application. If the elements I have corrugated strips 2 as described in said application Ser. No. 113,790 and straightening thereof is not necessary, the stretching steps described hereinafter may be omitted. However, the invention will be described in connection with elements 1 which require straightening and/or stretching. Preferably, the elements 1 are transferred, one-by-one, by the conveyor from the cutting station described in said application Ser. No. 122,467 as they are cut to length. Thus, the elements 1 are received successively at the upper end of the conveyor, as viewed in FIG. 1, and FIG. 1 illustrates the conditions after several elements 1 have been transferred to the conveyor and moved along the rails 4–7. When an element is received by the conveyor, the ends of the tube 2 generally will not be circular in cross-section either because the initial stock of tubing was not perfectly circular in cross-section or because the tubing was deformed in cross-section, either intentionally or otherwise, during the securing of the tube 2 to the strip 2 or the processing thereof. At a first station 11, the tube 2 and the strip 3 are stretched as described in such application Ser. No. 113,796, and the ends of the tube 2 are shaped so as to be substantially circular in cross-section as illustrated in FIG. 2. FIG. 2 illustrates only one end of the stretched element 1a, but the opposite end has the same configuration.

It will be noted from an examination of FIGS. 1 & 2 that the tube 2 and the strips 3 are co-extensive, in order for the panel element to be assembled with headers, a short length of each end of the tube 2 must be exposed for insertion into the corresponding openings in the headers. Accordingly, at a station 12, milling or trepanning tools, cut away the portions of the strip 3 immediately adjacent the end portions of the tube 2. At the same time, the tool trims away any metal exterior of the tube ends which is in excess of the size thereof required for a close fit between the end portions and the openings in the headers. The appearance of the ends of an element after trepanning is illustrated in FIG. 3.

Figure 3:
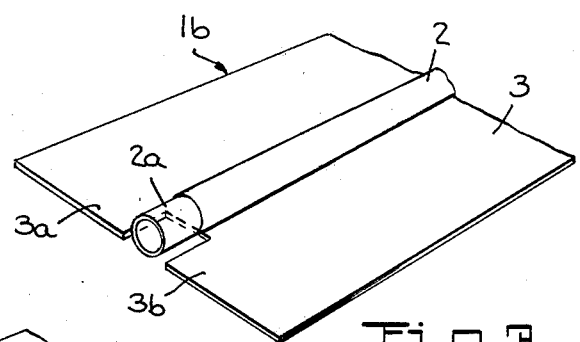
Figure 4:
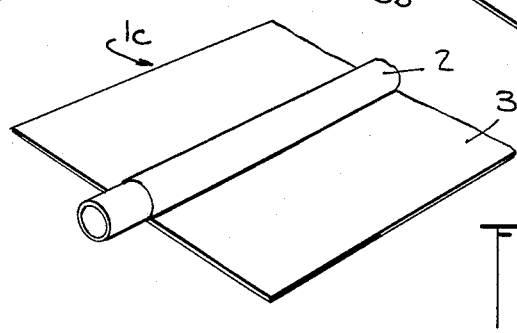

From an examination of FIG. 3, it will be found that only the portions of the strip 3 immediately adjacent the tube 2 have been removed at the station 12. The remaining portions 3a and 3b of the strip 3 outwardly of the portions which have been removed would still interfere with insertion of the ends of the tube 2 into the header openings if the openings are not surrounded by projections which can extend into the space between the portions 3a and 3b and the portion 2a of the tube 2. The portions 3a and 3b may be bent out of the way, e.g. at right angles to the plane of the strip 3 but, preferably, the portions 3a and 3b are severed from the remainder of the strip 3, and at both ends of panel element, at a station 13 so that both ends of an element have the appearance illustrated in FIG. 4. In the condition illustrated in FIG. 4, a panel element 1c is ready for assembly with headers and is removed from the conveyer in any desired manner, e.g. manually, and transported to apparatus for assembling the panel elements 1c with headers.

As previously mentioned, the exterior of the ends of the tube 2 should, after the trepanning step at station 12, have a relatively close fit with the openings in the headers to which the tube ends are to be secured, such as by means of solder. Preferably, the outside diameter of the tube stock as it is supplied to the apparatus for joining the tube 2 with the strip 3 is slightly larger than the header openings, so that when the ends are machined at station 12, some metal of the tube ends is removed, and the final outside diameter of the tube ends is only slightly smaller than the diameter of the header openings. However, the outside diameter of the original tube stock may vary along its length and in addition, after deformation during processing, the outside surface of the tube ends may not be substantially cylindrical and may be of a diameter less than the desired diameter. In such cases, and portions of the tube 2 may be enlarged in cross-section at station 11 prior to the machining thereof.

The longitudinal stretching of a tube 2-strip 3 combination is, described and claimed in said application Ser. No. 113,796, and the disclosure of said application is incorporated herein by reference thereto.

Figure 5:
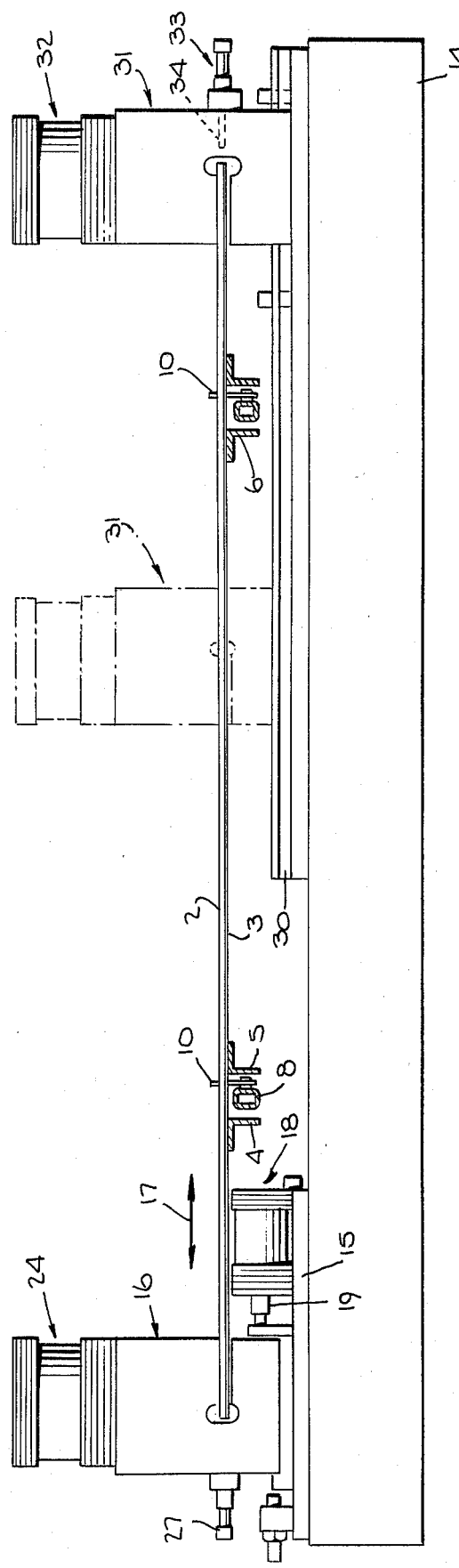
FIGS. 5 and 6 are, respectively, schematic, size elevation and plan views of most of an apparatus for shaping the end portions of a panel element tube and for stretching the panel element longitudinally.
Figure 6:
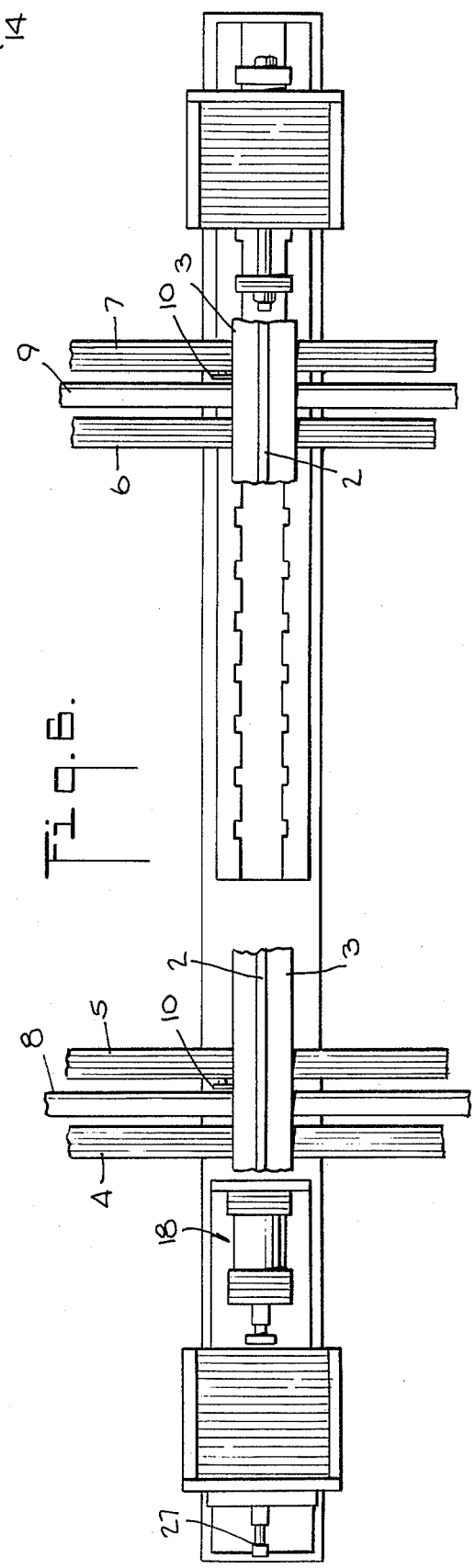
Figure 7:
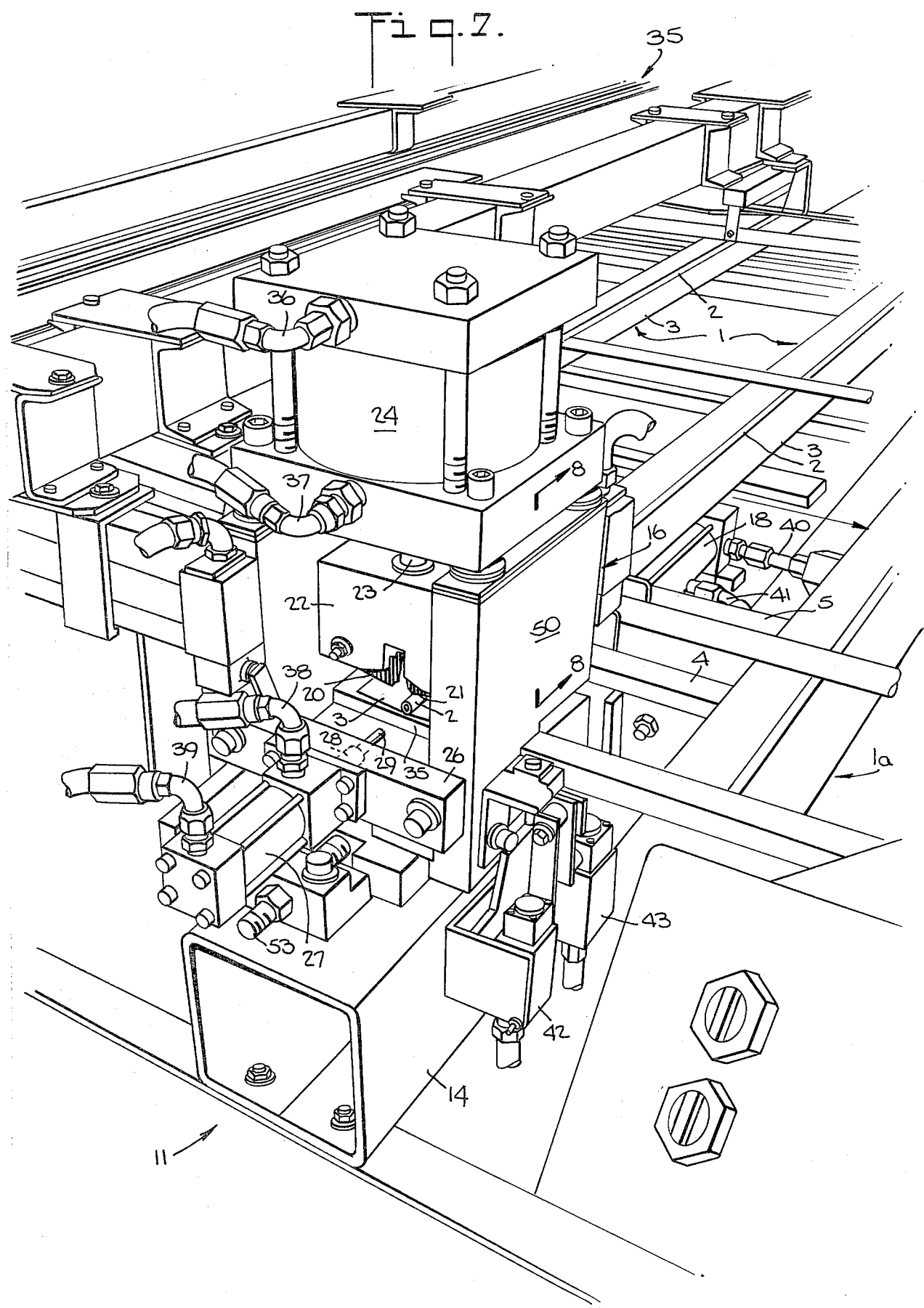
FIG. 7 is an enlarged, perspective view of a portion of an embodiment of the apparatus shown in FIGS. 5 & 6.
Figures 8, 9:
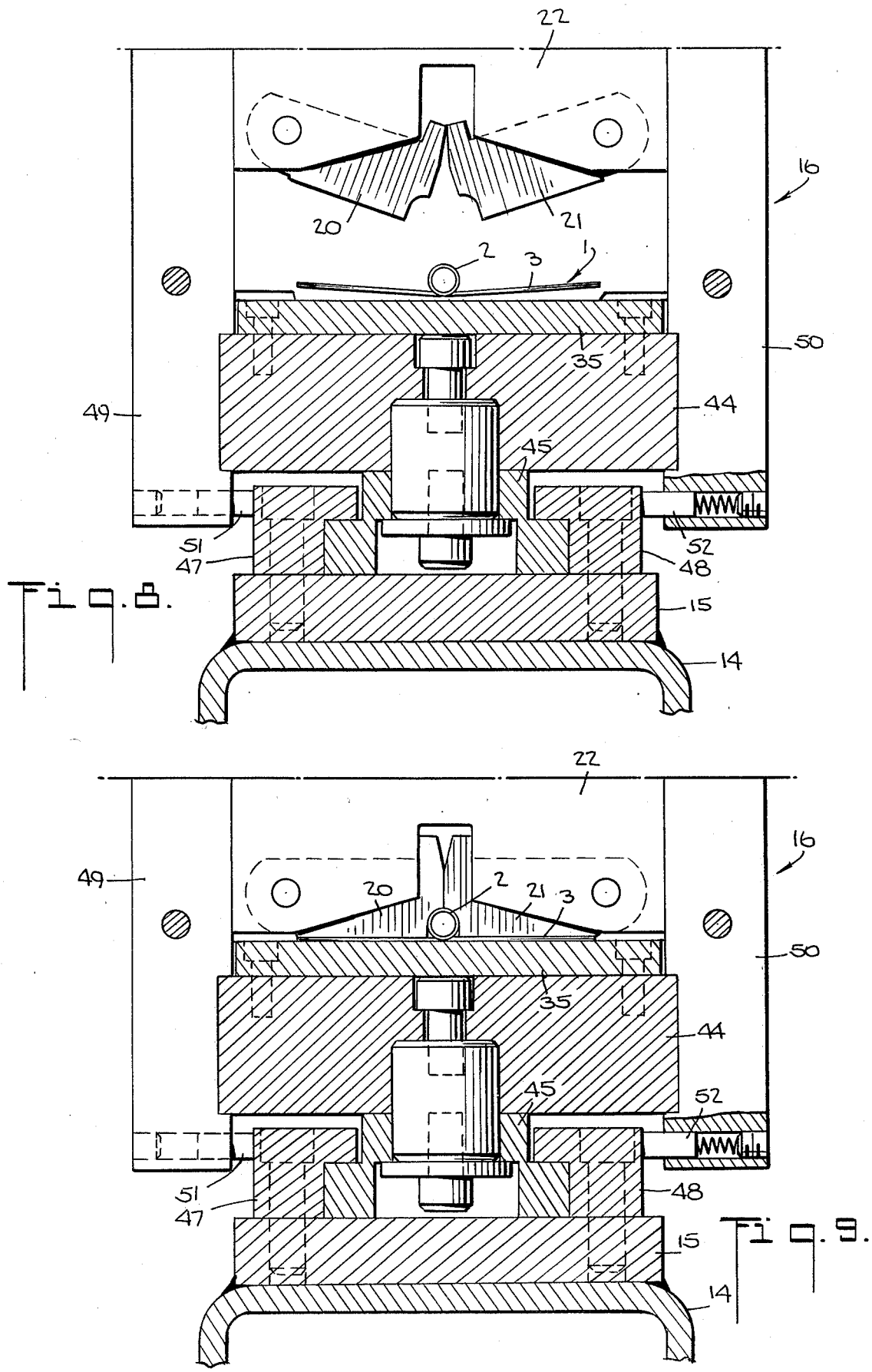
FIGS. 8 and 9 are enlarged, end elevation views, partly in cross-section, of a portion of the apparatus shown in FIG. 7 and illustrate the clamping means thereof in two different positions.

FIGS. 5 and 6 illustrate diagrammatically one form of apparatus which may be used to perform the stretching of a panel element 1 and if necessary, to enlarge the outside diameter of the portions of the tube 2 at the station 11. FIG. 7 illustrates the apparatus at one end of station 11 in greater detail, the apparatus at the opposite end of station 11 being the same. In the apparatus shown in FIG. 5–7, a rigid base 14 supports a sub-base 15 and rails 30 which are secured to the base 14. The sub-base 15 supports a first clamping stand 16 which is slidably mounted thereon. The stand 16 is movable in the directions indicated by the double-ended arrow 17 by a fluid operable piston and cylinder assembly 18, the cylinder being secured in a fixed position on the sub-base 15 and the rod 19 of the piston being secured to the stand 16. The stand 16 also carries a pair of clamping blocks 20 and 21 (see FIG. 7) hingedly mounted on a member 22 carried by a piston rod 23 of a fluid operable piston and cylinder assembly 24. The assembly 24 is secured to vertical supports 49 and 50 and when fluid under pressure is supplied to the assembly 24, the rod 23 moves the blocks 20 and 21 into engagement with the end portions of the tube 2 and the strip 3 to prevent movement thereof with respect to the stand 16 during the stretching operation.

A member 26 of the stand 16 has a further fluid operable piston and cylinder assembly 27 secured thereto. The piston rod 28 of the assembly 27 carries a plug 29 which, when fluid under pressure is supplied to the assembly 27, is pushed into the end of the tube 2 to aid in preventing the collapse of the end of the tube 2 under the pressure of the blocks 20 and 21. The outside diameter of the end portion of the tube 2 may also be increased by suitably selecting the diameter of the plug 29.

A second clamping stand 31, similar to the clamping stand 16, is adjustably mounted on the rails 30. The stand 31 may be secured to the rails 30 at various fixed positions thereon, as indicated by the dot-dash lines, to permit the apparatus to be used with panel elements 1 of different lengths. The stand 31 carries fluid operable piston and cylinder assemblies 32 and 33, corresponding respectively to the assemblies 24 and 27, clamping blocks corresponding to the blocks 20 and 21, a plug 34, etc.

With reference to FIG. 7, the numeral 35 designates the apparatus used to cut panel elements 1 to length from a long length of tube 2 -strip 3 combination and such apparatus is described in said application Ser. No. 122,467. An element 1 is received from the apparatus 35 and moved to a position intermediate the apparatus 35 and the station 11, but an element 1 could, of course, be directly transferred from the apparatus 35 to the station 11. After the element 1 has been processed at station 11, the conveyor then moves the element 1a (after stretching and/or straightening) either to the station 12 or to a position intermediate stations 11 & 12 as shown in FIG. 1. At the time that an element 1a is removed from the station 11, another element 1 is moved into position at the station 11 to be processed thereat.

Fluid under pressure is supplied to and removed from the piston and cylinder assembly 24 by way of the lines 36 and 37, is supplied to and removed from the piston and cylinder assembly 27 by way of the lines 38 and 39 and is supplied to an removed from the piston and cylinder assembly 18 by way of the lines 40 and 41. Limit switches 42 and 43 limit the movement of the stand 16 in a conventional manner.

With reference to FIGS. 8–11, FIGS. 8 & 9 respectively show the clamping mechanisms at station 11 in their open and in their clamped positions, FIG. 10 is a side elevation view, partly broken away, of most of one end of the clamping and stretching mechanisms at the left end of station 11, as viewed in FIGS. 5 & 6, and FIG. 11 illustrates the insertion of the plug 29 into the tube 2 at station 11. The platen 35, against which the strip 3 is pressed, is secured to a base member 44 supported by a slide 45 which rides on the sub-base 15 secured to the base 14. The slide 45 is held down and guided by a pair of side members 47 and 48 secured to the sub-base 15.

A pair of vertical supports 49 and 50 for the piston and cylinder assembly 24 are secured to the sides of the base member 44 and respectively carry spring biassed pins 51 and 52 which bear against the side members 47 and 48 for guiding purposes. Movement of the stand 16 to the left, as viewed in FIG. 10, is limited by an adjustable stop screw 53 mounted on the sub-base 15.

As illustrated in FIG. 11, the plug 29 is inserted into an end of the tube 2 when the clamping blocks 20 and 21 are pressed against the tube 2 and the strip 3 to shape the end of the tube 2 so that its cross-section is circular and if necessary, to prevent deformation of the end portion of the tube 2 by blocks 20 and 21. If it is necessary or desirable to increase the outside diameter of the end portion of the tube 2, the outside diameter of the plug 29 is selected so as to stretch the end portion radially by the desired amount. A similar plug 34 (see FIG. 5) is provided at the opposite end of the tube 2 for the same purposes.

In operation, the piston rod 19 is retracted, moving the stand 16 to the right as viewed in FIGS. 5,6, and 10. The stand 30 is adjusted on the rails 30 until it is at the spacing from the stand 16 which is correct for receiving the panel element 1. With the blocks 20 and 21 and the corresponding blocks at the stand 31 raised above the associated platens, by an amount sufficient to receive the end portions of the panel element 1 and with the plugs 29 and 34 retracted, the end portions of the panel element are inserted between the blocks 20 and 21 and the corresponding blocks of the stand 31, respectively. The assemblies 24 and 32 are operated to clamp one end portion of the tube 2 and the strip 3 between the blocks 20 and 21 and the surface of the platen 35 and the other end portion of the tube 2 and the strip 3 between the other blocks and the surface of the platen (not shown), and the assemblies 27 and 33 are then operated to insert the plugs 29 and 34 into the ends of the tube 2. After the end portion of the tube 2 and the strip 3 are tightly clamped in the stands 16 and 31, the assembly 18 is operated to move the stand 16 to the left, as viewed in FIGS. 5, 6, and 10, thereby to stretch the tube 2 and the strip 3 for the reasons set forth in said application Ser. No. 113,796.

After the tube 2 and the strip 3 have been stretched to the desired extent, the fluid pressure in the assembly 18 is reduced to permit the tube 2 and the strip 3 to contract, the plugs 29 and 34 are pulled out of the ends of the tube 2, and, the blocks 20, 21, etc. are raised. The stretched panel element is then removed from station 11 and is ready for further processing at station 12.

If ripples in the strip 3 have been removed by corrugating the strip 3, as described in said application Ser. No. 113,790 and the element 1 is sufficiently straight, station 11 may be omitted if shaping of the end portions of the tube 2 is not required.

In appearance, the stretched panel element 1a will have a substantially rectilinear tube 2 with metal of the strip 3 at each side thereof substantially free of ripples and lying substantially in a flat plane, the outboard edges of the strip 3 also being substantially rectilinear. The stretching of the tube 2 and the strip 3 will be less than 2.5% and preferably is from 0.5 to 1%. The appearance of a stretched element 1a with a corrugated strip 3 will be substantially the same except for the presence of the corrugations.

The stretched and straightened element 1a, or if stretching and straightening is not required, the element 1 produced at the cut-off apparatus 35, is then positioned at the station 12 where the exteriors of the tube 2 end positions are machined to a size required for insertion of the ends of the tube 2 into openings in headers and portions of the strip 3 immediately adjacent the tube end portions are cut away as illustrated in FIG. 3. FIGS. 12–15 illustrate the apparatus at one end of the station 12, the apparatus at the other end of station 12 being substantially identical to the apparatus illustrated in FIGS. 12–15.

The clamping apparatus at station 12 comprises a pair of rigid members 54 and 55 supported from a base 56 by a pair of shafts 57 and 58. The member 54 is held in a fixed position on the shafts 57 and 58, such as by a collar 57a and 58a, and the member 55 can move vertically on the shafts 57 and 58. The member 55 is movable vertically by a fluid operable piston and cylinder assembly 59 secured to the member 54 and having a piston rod 60 secured to the member 55. The member 55 carries a pair of clamping blocks, like the blocks 20 and 21, hingedly mounted on a yoke 61 secured to the member 55, only one clamping block 62 being shown in the FIG. 12 and 13. The action of the clamping blocks carried by the member 55 is similar to the action of the blocks 20 and 21 previously described, that is, when the member 55 is moved downwardly by the piston rod 60, the blocks grip the tube 2 and press the strip 3 against a platen 63 secured to the base 56.

Figure 13:
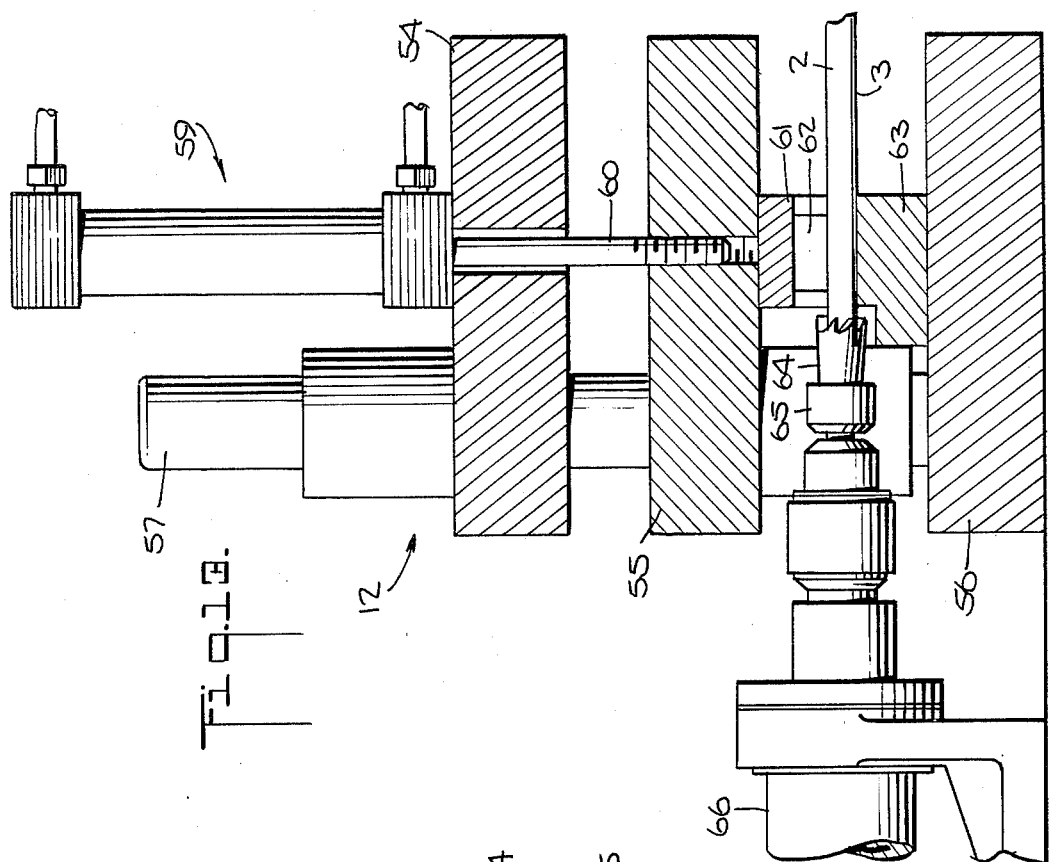
FIG. 12 and 13 are side elevation views, partly in cross-section of an embodiment of apparatus for machining the end portions of a panel element and illustrate the parts in two different positions.
Figure 12:
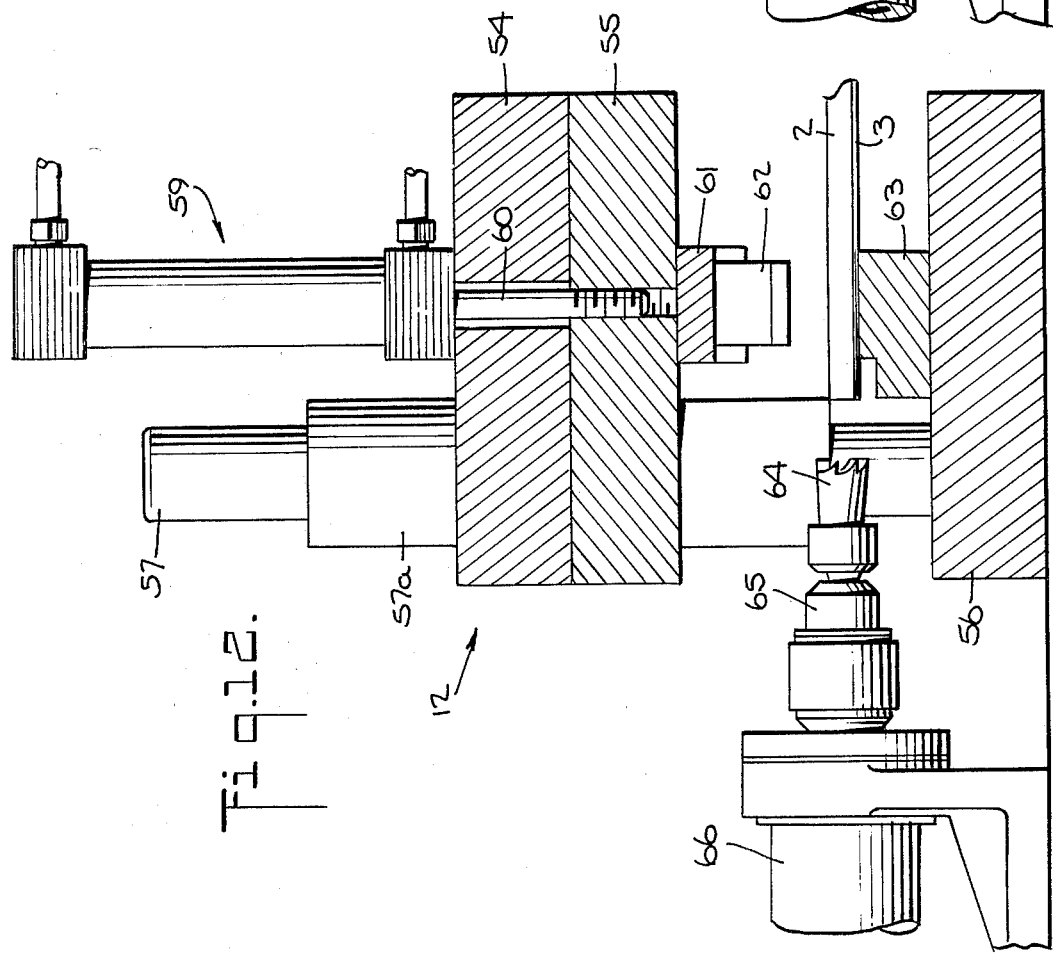

When the ends of the panel element have been securely clamped in position, a trepanning tool 64 mounted on the shaft 65 of a motor 66, preferably, an air driven motor of a well-known type, is advanced toward the end of the tube 2 as illustrated in FIGS. 13, 14, and 16. The Shaft 65 may be reciprocated in the direction of its axis by a conventional piston and cylinder assembly (not shown). The tool 64 has teeth 67 which not only permit it to cut in the axial direction and thereby remove portions of the strip 3 immediately adjacent to the tube 2 but also causes removal of metal at the exterior of the tube 2 which is in excess of the desired outside diameter of the tube 2 as indicated in FIG. 16. After processing at station 12, the ends of the panel element have the appearance shown in FIG. 3.

Unless the headers to which the panel elements are to be joined have protrusions around the openings thereon which fit around the exposed ends 2a of the tube 2 (see FIG. 3) and within the space between the end 2a and the remaining portions 3a and 3b of the strip 3, it is necessary either to bend the portions 3a and 3b out of the way or to remove the portions 3a and 3b. In the preferred embodiment of the invention, the portions 3a and 3b are removed by shearing at the station 13. FIGS. 17–21 illustrate shearing apparatus for use at one end of the station 13, the shearing apparatus at the other end of station 13 being substantially identical to the apparatus shown in FIGS. 17–21.

Figure 17:
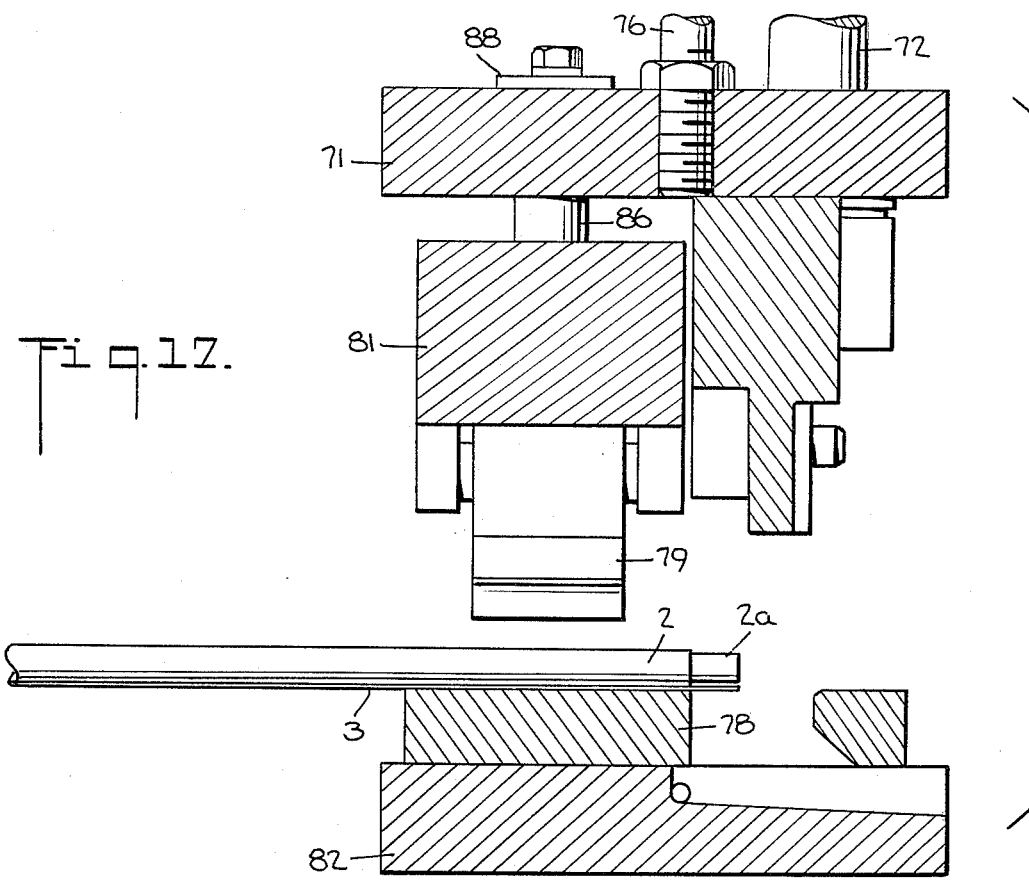
FIGS. 17 and 18 are side elevation views, partly in cross-section, of an embodiment of shearing apparatus for removing portions of the panel element strip adjacent to the machined end portions of the tube and illustrate the parts in two different positions.
Figure 18:
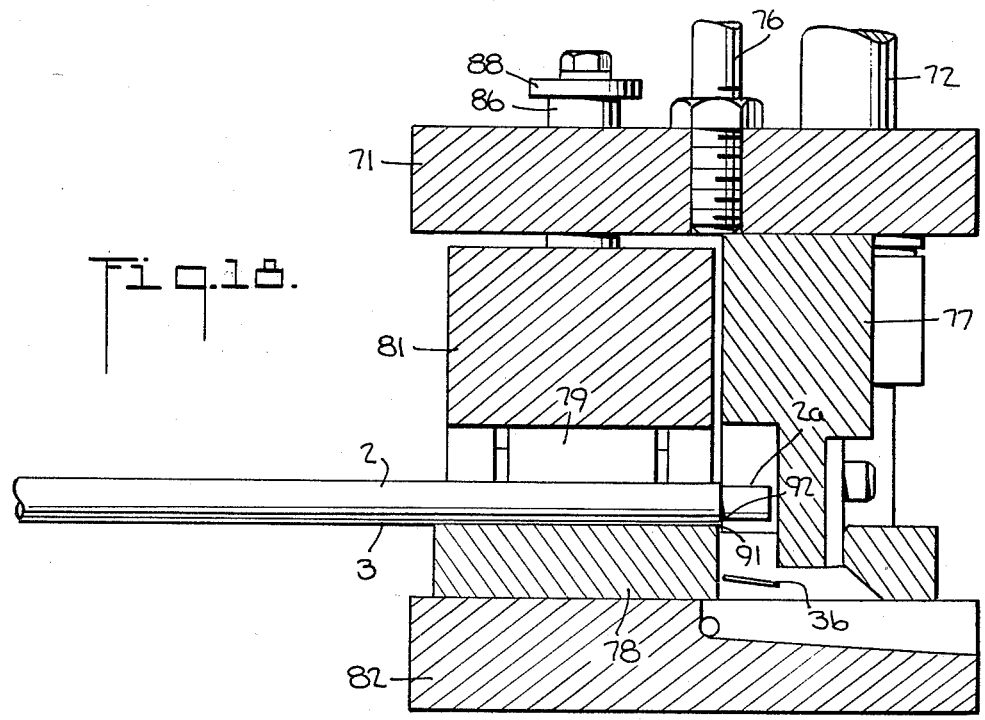

The shearing apparatus illustrated in FIGS. 17–21 comprises a pair or rigid platens 70 and 71 supported on a pair of vertical shafts 72 and 73. The platen 70 is held in a fixed position relative to the shafts 72 and 73 by bolts 74, but the platen 71 can move vertically as indicated in FIGS. 17 and 18, FIGS. 17 and 18 respectively showing the upper and lower positions of the platen 71. The platen 71 is moved between such positions by means of a fluid operable piston and cylinder assembly 75 secured to the platen 70 and having a piston rod 76 secured to the platen 71.

A punch 77 is secured to the platen 71 for movement therewith, and at its lower end the punch 77 is shaped so that it straddles the tube 2 and so that it can engage the strip 3 without engaging the tube 2. The punch 77 cooperates with a die 78 to cause the portions 3a and 3b (see FIG. 3) to be sheared off when the punch 77 is lowered. FIG. 20 illustrates the appearance and position of the element 1b before the punch 77 is lowered and FIG. 21 is similar to FIG. 20 but shows the punch 77 after it has been lowered.

The platen 71 also carries a pair of clamping blocks 79 and 80, similar to the clamping blocks 20 and 21 for clamping the tube 24 the strip 3 to the die 78. The blocks 79 and 80 are pivotably mounted on a member 81 which can move vertically with respect to the platen 71, and the blocks 79 and 80 operate in the same manner as the blocks 20 and 21. The blocks 79 and 80 are urged away from the member 81 by spring biassed buttons 83, and their movement is limited by adjustable screws 84 engagable with hardened pins 85.

The member 81 is secured to a pair of pins 86 and 87 with collars 88 and 89 at their upper ends. The pins 86 and 87 pass through the platen 71 with a sliding fit, and the member 81 is urged away from the platen 71 by a plurality of springs, one of which is designated by the reference numeral 90. Thus, when the platen 71 is raised by the assembly 75, the number 81 and the platen 71 have the relative positions shown in FIG. 17, and when the platen 71 is lowered, the platen 71 and the member 81 have the relative positions shown in FIG. 18 and 19.

When the apparatus of the invention is in operation, the platen 71 is raised by the assembly 75 so that the parts have the positions shown in FIG. 17, and the conveyor positions an element 1b, previously processed at the station 12, so that its ends are positioned with respect to the die 78 as shown in FIG. 17. The platen 71 is then lowered by the assembly 75, and at first, the blocks 79 and 80 grip the tube 2 and the strip 3. As the platen 71 is lowered further, the punch 77 engages the strip 3 at opposite sides of the tube 2 end position which overhangs the die 78 and shears off the portions 3a and 3b, as shown in FIG. 18. During the further lowering of the platen 71, the member 81 is stationary and the springs 90 are compressed.

While it is preferred that the portions 3a and 3b be sheared off the strip 3 as described, it will be apparent to those skilled in the art that by increasing the spacing 91 between the punch 77 and the die 78 in the direction longitudinally of the tube 2 and preferably, also, by rounding the upper corner 92 of the die 78 which is adjacent the punch 77, the apparatus described in connection with FIG. 17–21 may be used to bend the portions 3a and 3b at right angles to the plane of the strip 3, thereby modifying the strip 3 so that the end portions 2a of the tube 2 extend beyond the ends of the strip 3.

While the advance of the panel elements and the processing thereof can be controlled manually, it is preferred that such advance and processing be controlled automatically and in synchronism with the cut-off apparatus which supplies the panel element 1. Controls for operating the apparatus automatically are known in the art.

When the apparatus of the invention is operating, a first panel element 1 is received by the conveyer the cut-off apparatus 35 (FIG. 7) and is transferred to the position of the uppermost element 1 in FIG. 1 where it is held while the next element 1 is being cut-off by the apparatus 35.

When the next, or second, element 1 is cut to length and received by the conveyor, it is transferred to the position of the uppermost element 1 in FIG. 1, and the first element 1 previously received by the conveyor is transferred to the station 11 where it is held while the clamping blocks 20 and 21, etc. of the stands 16 and 31 engage the ends of the element 1, the plugs 29 and 34 are inserted into the ends of the tube 2 and the element 1 is stretched, producing a stretched element 1a having tube end portions which are substantially circular in cross-section.

While the first element 1 is being processed at the station 11, a third element 1 is cut to length in the apparatus 35 and is received by the conveyor. After the first element 1 is processed at the station 11, the conveyor moves the processed element 1a to the position intermediate the stations 11 and 12, moves the second element 1 to the station 11 and moves the third element 1 to the uppermost position of element 1 in FIG. 1. A fourth element 1 is then cut to length in the apparatus 35 and is received by the conveyor, and the second element is processed at the station 11.

After the second element 1 has been processed at the station 11, it is moved by the conveyor to the position intermediate the stations 11 and 12 shown in FIG. 1, the fourth element 1 is moved to the upperward position shown in FIG. 1. The third element is moved to the station 11 and the first element, now designated 1a, is moved to the station 12. At this point, the third element 1 is processed at station 11, and the first element 1a is clamped at its opposite ends by the clamping blocks at the station 12 (blocks 62, etc. see FIG. 12 and 13) and the rotating tools 64 are advanced to machine the exterior surfaces of the tube end portions and to remove metal of the strips immediately adjacent thereto to produce element 16 shown in FIG. 3. While the first and third elements are being processed respectively at the stations 12 and 11, a fifth element is cut to length at the apparatus 35 and is received by the conveyor.

The conveyor then moves the various elements so that the fifth element is in the uppermost position shown in FIG. 1, the fourth element is at station 11, the third element is intermediate stations 11 and 12, the second element is at station 12 and the first element is intermediate stations 12 and 13. The fourth and second elements are then processed at stations 11 and 12 respectively while a sixth element 1 is cut to length at the apparatus 35 and is received by the conveyor.

The conveyor then moves the first through sixth elements so that the first element is at the station 13, the third element is at the station 12, the fifth element is at the station 11 and the other elements are in obvious positions. At this point, the fifth and third elements are processed respectively at the stations 11 and 13 and the end portions 3a and 3b of the strips 3 of the first element are removed at the station 13, the clamping blocks 79, 80, etc. engaging the first element near the ends thereof and the punches 77, etc. shearing off such portions 3a and 3b. Thus, after a sufficient number of elements 1 have been received by the conveyor, an element 1 is being cut-off at the apparatus 35 simultaneously with the processing of three elements at the stations 11, 12 and 13.

The operation of the apparatus continues as described until the desired number of elements have been produced and removed from the conveyor. For space reasons and in order to keep the length of the steps of the conveyor apparatus relatively small, it is preferred that the panel elements be moved to positions intermediate the stations 11, 12 and 13 before being moved into a station. However, it is to be understood that such intermediate positions may be omitted, and the panel elements may be moved directly from the cut-off apparatus 35, to the station 11, then to the station 12, then to the station 13 and then off the conveyor. Also, as mentioned herein before, the station 11 may be rendered inoperative or omitted if stretching or straightening of the panel element 1 and shaping of the tube and portions are not required.

Although preferred embodiments of the present invention have been described and illustrated, it will be apparent to those skilled in the art that various modifications may be made without departing from the principles of the invention.

What is claimed is:

1. Method for processing a heat exchanger panel element comprising a metal tube substantially continuously secured throughout its length to a metal strip, said strip being wide relative to the cross-sectional dimension of said tube, said method comprising the steps of:
    when the tube is not rectilinear along its axis, gripping at least said tube at its opposite ends and mechanically stretching it length-wise to at least cause said tube to be substantially rectilinear along its axis;
    mechanically modifying the portions of the element at opposite ends of the element to:
    (a) remove any non-circular cross-section of the end portions of the tube;
    (b) provide an exterior diameter for the end portions of the tube which is not greater than a desired diameter; and
    (c) remove portions of the strip outwardly of and adjacent to said end portions of said tube while leaving other portions of the strip outwardly of the portions thereof which are removed; and
    modifying the remaining portions of said strip outwardly of said tube portions at said opposite ends, so that said tube portions extend beyond the ends of the strip, the steps being performed in any order.

2. A method as set forth in claim 1 including all the steps set forth and performed in the order named.

3. A method as set forth in claim 1 or 2 comprising the further step of enlarging the outer diameter of said tube portions prior to the machining thereof.

4. A method as set forth in claim 1 or 2 wherein both said tube and said strip are gripped at opposite ends and are stretched by not more than 2.5%.

5. A method as set forth in claim 1 or 2 wherein said remaining portions of said strip are modified by severing them from said strip.

* * * * *